(12) United States Patent
Babagholami Mohamadabadi et al.

(10) Patent No.: US 12,051,237 B2
(45) Date of Patent: Jul. 30, 2024

(54) MULTI-EXPERT ADVERSARIAL REGULARIZATION FOR ROBUST AND DATA-EFFICIENT DEEP SUPERVISED LEARNING

(71) Applicant: Samsung Electronics Co., Ltd., Suwon-si (KR)

(72) Inventors: Behnam Babagholami Mohamadabadi, San Diego, CA (US); Qingfeng Liu, San Diego, CA (US); Mostafa El-Khamy, San Diego, CA (US); Jungwon Lee, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 332 days.

(21) Appl. No.: 17/674,832

(22) Filed: Feb. 17, 2022

(65) Prior Publication Data

US 2022/0301296 A1    Sep. 22, 2022

Related U.S. Application Data

(60) Provisional application No. 63/160,717, filed on Mar. 12, 2021.

(51) Int. Cl.
*G06V 10/82* (2022.01)
*G06N 5/04* (2023.01)
(Continued)

(52) U.S. Cl.
CPC .............. *G06V 10/82* (2022.01); *G06N 5/04* (2013.01); *G06V 10/774* (2022.01); *G06V 10/776* (2022.01); *G06V 10/7784* (2022.01)

(58) Field of Classification Search
CPC .... G06V 10/82; G06V 10/774; G06V 10/776; G06V 10/7784; G06N 5/04; G06N 3/045;
(Continued)

(56) References Cited

U.S. PATENT DOCUMENTS 8,065,244 B2   11/2011   Chen et al.
9,900,790 B1    2/2018   Sheen et al.
(Continued)

FOREIGN PATENT DOCUMENTS

GB        2572164 A       9/2019
WO     2020226630 A1     11/2020

OTHER PUBLICATIONS

Valizadegan, Hamed et al., "Learning Classification Models from Multiple Experts," Journal of Biomedical Informatics, vol. 46, 2013, pp. 1125-1135.
(Continued)

*Primary Examiner* — Bobbak Safaipour
*Assistant Examiner* — Jongbong Nah
(74) *Attorney, Agent, or Firm* — Renaissance IP Law Group LLP (57) ABSTRACT

A system and a method to train a neural network are disclosed. A first image is weakly and strongly augmented. The first image, the weakly and strongly augmented first images are input into a feature extractor to obtain augmented features. Each weakly augmented first image is input to a corresponding first expert head to determine a supervised loss for each weakly augmented first image. Each strongly augmented first image is input to a corresponding second expert head to determine a diversity loss for each strongly augmented first image. The feature extractor is trained to minimize the supervised loss on weakly augmented first images and to minimize a multi-expert consensus loss on strongly augmented first images. Each first expert head is
(Continued)

trained to minimize the supervised loss for each weakly augmented first image, and each second expert head is trained to minimize the diversity loss for each strongly augmented first image.

20 Claims, 5 Drawing Sheets

(51) Int. Cl.
  *G06V 10/774* (2022.01)
  *G06V 10/776* (2022.01)
  *G06V 10/778* (2022.01)
(58) Field of Classification Search
  CPC .......... G06N 3/09; G06N 3/094; G06N 20/20; G06N 3/063
  See application file for complete search history.

(56) References Cited

U.S. PATENT DOCUMENTS

| | | | |
|---|---|---|---|
| 9,916,522 B2 | 3/2018 | Sanchez et al. | |
| 10,261,685 B2 | 4/2019 | Deselaers et al. | |
| 10,423,861 B2 | 9/2019 | Gao et al. | |
| 10,769,550 B2* | 9/2020 | Hsieh | G06N 20/20 |
| 11,003,982 B2 | 5/2021 | Baker | |
| 11,100,399 B2 | 8/2021 | Dong et al. | |
| 2019/0244108 A1 | 8/2019 | Meyerson et al. | |
| 2019/0294931 A1 | 9/2019 | Risser et al. | |
| 2020/0311613 A1 | 10/2020 | Ma et al. | |
| 2020/0387782 A1 | 12/2020 | Hegde et al. | |
| 2020/0410090 A1 | 12/2020 | Baker | |
| 2021/0103814 A1 | 4/2021 | Tsiligkaridis | |
| 2021/0158156 A1 | 5/2021 | Shamir et al. | |
| 2021/0192357 A1 | 6/2021 | Sinha et al. | |
| 2021/0241112 A1 | 8/2021 | Dai et al. | |
| 2021/0304001 A1 | 9/2021 | Po et al. | |
| 2021/0374553 A1* | 12/2021 | Li | G06N 3/088 |
| 2022/0156591 A1* | 5/2022 | Li | G06V 10/82 |
| 2022/0156593 A1* | 5/2022 | Liu | G06N 3/084 |

OTHER PUBLICATIONS

Zhou, Kaiyang et al., "Domain Adaptive Ensemble Learning," IEEE Transactions on Image Processing, vol. 30, 2021, pp. 8008-8018.

* cited by examiner

MULTI-EXPERT ADVERSARIAL REGULARIZATION FOR ROBUST AND DATA-EFFICIENT DEEP SUPERVISED LEARNING

CROSS-REFERENCE TO RELATED APPLICATION

This application claims the priority benefit under 35 U.S.C. § 119(e) of U.S. Provisional Application No. 63/160,717, filed on Mar. 12, 2021, the disclosure of which is incorporated herein by reference in its entirety.

TECHNICAL FIELD

The subject matter disclosed herein relates to a system and a method for training a deep neural network (DNN). More particularly, the subject matter disclosed herein discloses a system and a method to train a multi-expert neural network using adversarial regularization for deep supervised learning.

BACKGROUND

Deep neural networks (DNNs) may achieve high accuracy when there is abundant training data having the same distribution as the test data. One of the issues that may be encountered is an image understanding issue, such as image classification, may be based on a data deficiency. For example, lack of sufficient labeled images in a training set may often result in overfitting. Another issue may be a mismatch between the training and the test domains, e.g., test data corruption, which calls for robust deep-learning models. These issues may be encountered frequently in practice and may limit performance of a DNN in many real-world applications.

DNNs have achieved a state-of-the-art performance in various computer-vision applications, such as, image classification, object detection, semantic segmentation, etc. An issue that may be encountered when using DNNs for these applications may be the lack of sufficient labeled images in a training set, which may result in overfitting. On the other hand, current DNNs may depend on an ability of training data to faithfully represent the data that may be encountered during deployment. In practice, data distributions evolve, models encounter new scenarios and the training data may capture only a narrow slice of the underlying data distribution. Mismatches between the training and test data may make DNNs not as generally robust across shifts in data distribution.

Data Augmentation (DA) (i.e., diluting undesired signals of training samples by applying transformations to existing examples) may be a powerful approach to address robustness and generalization challenges exhibited by DNNs. The augmented data may represent a more comprehensive set of possible data points, thus minimizing a distance between the training and any future testing sets. DA may attempt to tackle generalization and robustness issues the root of the problem—the training dataset—based on an assumption that more information may be extracted from the original dataset through augmentation. The augmentations artificially inflate the training dataset size by transforming existing images so that the labels of the transformed images are preserved. The augmentations may include geometric and color transformations, random erasing, adversarial training, neural style transfer, etc. Another type of augmentation technique, referred to as oversampling augmentation, may create synthetic instances and that are added to the training set. Oversampling augmentation may include mixing images, feature-space augmentations, and generative adversarial networks (GANs), etc.

Recent advances have expanded the conventional concept of data augmentation and have provided several new approaches, such as leveraging information in unlabeled data, automatically learning augmentation functions, and generating samples (with a constraint) that maximize the training loss along training, which has lately become widely accepted as adversarial training.

Small corruptions or perturbations on images may drastically change predictions of CNN models. While adversarially generated corruptions may be thought of as a worst-case scenario, natural noise such as blurs and artifacts generated by JPEG compression, may also harm performance of CNNs. For a real-world application of CNNs, this vulnerability should be overcome. A strong defense against adversarial examples may be adversarial training of CNN models by using adversarial examples.

Unfortunately, such an approach may fail in natural noise because CNNs trained on a specific type of noise do not generalize to other types of noise. Instead, robust training techniques that are agnostic to test-time noise a priori should be used. Data augmentation may be an approach to address this issue by encoding additional priors in the form of invariant feature transformations. Intuitively, data augmentation may enable a model to train on more data, thereby encouraging the model to capture certain types of invariance with respect to the inputs and outputs leading to better generalization performance. Data augmentation may also produce data that may be closer to an out-of-distribution target task, and may be a key factor driving the state-of-the-art. For example, random occlusion techniques, such as Cutout, may also improve accuracy on clean data. Rather than occluding a portion of an image, CutMix replaces a portion of an image with a portion of a different image.

Mixup also may use information from two images. Rather than implanting one portion of an image inside another, Mixup may produce an element-wise convex combination of two images. Some types of data augmentation have also been reported to improve robustness. AugMix may aim to make models robust to out-of-distribution data by exposing a model to a wide variety of augmented images. In AugMix, several augmentation "chains" may be sampled in which a chain may be a composition of one to three randomly selected operations. The augmented images from each chain may be combined with a random convex combination. The final stage of AugMix may combine the original and augmented image with a convex combination sampled from some Beta distribution.

Separate from these approaches are learned augmentation methods, such as AutoAugment in which a group of augmentations may be tuned to optimize performance on a downstream task. A popular way to make networks robust to adversarial examples may be with adversarial training. This, however, may tend to increase training time by an order of magnitude and substantially degrades accuracy on non-adversarial images.

Ensemble methods have been extensively researched by the machine-learning community. The principle may be to train multiple learners for the same problem and combine the learners for inference (prediction). Ensemble-based methods may train collections of models using various techniques (e.g., subsampling of observations and features, boosting, penalizing the correlation of model predictions to enforce some notion of model diversity so that aggregate predictions outperform single model predictions. In the context of deep learning, it has been shown that a simple approach of adversarially training multiple randomly initialized models from scratch and ensembling the models has yielded models having a strong predictive uncertainty and calibration. It has been shown that hyperensembles, which vary random initialization and hyper parameters, have outperformed the deep ensembles.

SUMMARY

An example embodiment provides a method to train a neural network that may include: weakly augmenting a first image, by a controller, $k_1$ times to form $k_1$ weakly augmented first images; strongly augmenting the first image, by the controller, $k_2$ times to form $k_2$ strongly augmented first images, $k_1+k_2=K$ in which $k_1$, $k_2$ and K are integers; inputting the first image, the $k_1$ weakly augmented first images and the $k_2$ strongly augmented first images, by the controller, into a feature extraction network of the neural network to obtain augmented features from the first image, the $k_1$ weakly augmented first images and the $k_2$ strongly augmented first images; inputting each respective $k_1$ weakly augmented first image, by the controller, into a corresponding first expert head of the neural network to determine a supervised loss $\mathcal{L}_s$ for each weakly augmented first image; inputting each respective $k_2$ strongly augmented first image, by the controller, into a corresponding second expert head of the neural network to determine a diversity loss $\mathcal{L}_d$ for each strongly augmented first image; training the feature extraction network, by the controller, to minimize the supervised loss $\mathcal{L}_s$ on the $k_1$ weakly augmented first images and to minimize a multi-expert consensus loss $\mathcal{L}_c$ on the $k_2$ strongly augmented first images; training each first expert head, by the controller, to minimize the supervised loss $\mathcal{L}_s$ for each weakly augmented first image; and training each second expert head, by the controller, to minimize the diversity loss $\mathcal{L}_d$ for each strongly augmented first image. In one embodiment, weakly augmenting the first image may include weakly augmenting the first image, by the controller, using an augmenting technique selected from a group of augmenting techniques. In another embodiment, the group of augmenting techniques may include an autocontrast augmenting technique, an equalizing augmenting technique, a posterizing augmenting technique, a solarizing augmenting technique, a color augmenting technique, a contrast augmenting technique, a brightness augmenting technique, and a sharpness augmenting technique. In still another embodiment, weakly augmenting the first image may further include weakly augmenting the first image, by the controller, using the augmenting technique that has been randomly selected from the group of augmenting techniques. In yet another embodiment, strongly augmenting the first image may include strongly augmenting the first image, by the controller, using an augmenting technique selected from a group of augmenting techniques. In one embodiment, the group of augmenting techniques may include an autocontrast augmenting technique, an equalizing augmenting technique, a posterizing augmenting technique, a solarizing augmenting technique, a color augmenting technique, a contrast augmenting technique, a brightness augmenting technique, and a sharpness augmenting technique. In another embodiment, strongly augmenting the first image may include strongly augmenting the first image, by the controller, using the augmenting technique randomly that has been selected from the group of augmenting techniques. In still another embodiment, the method may further include running, by the controller. an inference operation of the neural network trained by the method disclosed herein.

An example embodiment provides a method to train a neural network in which the method may include: selecting a first augmenting technique from a group of augmenting techniques; weakly augmenting a first image, by a controller, $k_1$ times using the first augmenting technique to form $k_1$ weakly augmented first images; selecting a second augmenting technique from the group of augmenting techniques; strongly augmenting the first image, by the controller, $k_2$ times using the second augmenting technique to form $k_2$ strongly augmented first images in which $k_1+k_2=K$ and $k_1$, $k_2$ and K are integers; inputting the first image, the $k_1$ weakly augmented first images and the $k_2$ strongly augmented first images, by the controller, into a feature extraction network of the neural network to obtain augmented features from the first image, the $k_1$ weakly augmented first images and the $k_2$ strongly augmented first images; inputting each respective $k_1$ weakly augmented first image, by the controller, into a corresponding first expert head of the neural network to determine a supervised loss $\mathcal{L}_s$ for each weakly augmented first image; inputting each respective $k_2$ strongly augmented first image, by the controller, into a corresponding second expert head of the neural network to determine a diversity loss $\mathcal{L}_d$ for each strongly augmented first image; training the feature extraction network, by the controller, to minimize the supervised loss $\mathcal{L}_s$ on the $k_1$ weakly augmented first images and to minimize a multi-expert consensus loss $\mathcal{L}_c$ on the $k_2$ strongly augmented first images; training each first expert head, by the controller, to minimize the supervised loss $\mathcal{L}_s$ for each weakly augmented first image; and training each second expert head, by the controller, to minimize the diversity loss $\mathcal{L}_d$ for each strongly augmented first image. In one embodiment, the group of augmenting techniques may include an autocontrast augmenting technique, an equalizing augmenting technique, a posterizing augmenting technique, a solarizing augmenting technique, a color augmenting technique, a contrast augmenting technique, a brightness augmenting technique, and a sharpness augmenting technique. In another embodiment, the first augmenting technique may be different from the second augmenting technique. In still another embodiment, selecting the first augmenting technique may include randomly selecting the first augmenting technique from the group of augmenting techniques. In yet another embodiment, selecting the second augmenting technique may include randomly selecting the second augmenting technique from the group of augmenting techniques. In one embodiment, the first image may be part of a group of images. In another embodiment, the method may be performed on a subset of the group of images. In still another embodiment, the method may be performed on each of the images in the group of images. In yet another embodiment, the method may include running, by the controller. an inference operation of the neural network trained by the method disclosed herein.

An example embodiment provides a system to train a neural network in which the system may include a neural processing circuit and a host computing device. The neural processing circuit may include a first memory. The host computing device may include a second memory, and the host computing device may be configured to: weakly augment a first image $k_1$ times to form $k_1$ weakly augmented first images; strongly augment the first image $k_2$ times to form $k_2$ strongly augmented first images in which $k_1+k_2=K$ and $k_1$, $k_2$ and K are integers; and control the neural processing circuit to: input the first image, the $k_1$ weakly augmented first images and the $k_2$ strongly augmented first images into a feature extraction network of the neural network to obtain augmented features from the first image, the $k_1$ weakly augmented first images and the $k_2$ strongly augmented first images; input each respective $k_1$ weakly augmented first image into a corresponding first expert head of the neural network to determine a supervised loss $\mathcal{L}_s$ for each weakly augmented first image; input each respective $k_2$ strongly augmented first image into a corresponding second expert head of the neural network to determine a diversity loss $\mathcal{L}_s$ for each strongly augmented first image; train the feature extraction network to minimize the supervised loss $\mathcal{L}_s$ on the $k_1$ weakly augmented first images and to minimize a multi-expert consensus loss $\mathcal{L}_c$ on the $k_2$ strongly augmented first images; train each first expert head to minimize the supervised loss $\mathcal{L}_s$ for each weakly augmented first image; and train each second expert head to minimize the diversity loss $\mathcal{L}_d$ for each strongly augmented first image. In one embodiment, the host computing device may be further configured to weakly augment the first image using a first augmenting technique selected from a group of augmenting techniques, and to strongly augment the first image using a second augmenting technique selected from the group of augmenting techniques. In another embodiment, the group of augmenting techniques may include an autocontrast augmenting technique, an equalizing augmenting technique, a posterizing augmenting technique, a solarizing augmenting technique, a color augmenting technique, a contrast augmenting technique, a brightness augmenting technique, and a sharpness augmenting technique.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein provides a deep learning model, referred to herein as a Multi-Expert Adversarial Regularization (MEAR) learning model, that is an effective tool for two important computer-vision tasks, image classification and semantic segmentation. The MEAR learning model involves a limited computational overhead and thereby improves generalization and robustness of deep-supervised learning models. In one embodiment, the MEAR learning model may include a single feature extractor and multiple classifier heads (experts). The MEAR learning model aims to learn the extractor in an adversarial manner by leveraging complementary information from the multiple classifier heads and ensemble to be more robust for an unseen test domain.

A feature that the MEAR learning model provides is to incorporate multiple experts into a network and train the experts the network in an adversarial fashion. One key benefit of the MEAR learning model may be its simplicity because it does not involve significant modifications to baseline State-of-the-Art (SOTA) network architectures. The MEAR learning model may provide a computationally efficient solution as compared to typical ensemble combining methods because the MEAR learning model involves a single forward-inference pass. Thus, the MEAR learning model improves generalization performance and robustness with minor changes to a number of parameters.

Although how to generate augmented samples has been discussed in the literature, the subject matter disclosed herein provides how to train the models with augmented samples. In one embodiment, the MEAR learning model disclosed herein includes two primary aspects. A first aspect includes an architectural modification of a baseline deep network to form a deep multi-head network that includes a feature extractor and multiple (K) expert heads (classifier heads) that make K predictions based on the last hidden layer. A second aspect includes a technique to train the multiple experts and the feature extractor in an adversarial way. When testing, the experts make K independent predictions based on the same input, forming an ensemble for a single robust prediction that may be computed in a single forward pass.

Diversity of the experts may be reinforced by maximizing the discrepancy (disagreement) between the outputs of the experts on (strongly) augmented training samples with a goal of consistency regularization (CR), which is used in semi-supervised learning (SSL) and adversarial learning. On the other hand, the feature extractor may learn to generate discriminative features by minimizing the discrepancy between the ensemble output and the true labels for strongly augmented samples. An effective model may be obtained by an adversarial regularizer in which different experts are allowed to exploit complementary task-specific information from the training data, thereby resulting in a more robust and domain-generalizable model. Unlike other ensemble methods, the MEAR learning model provides that all of the ensemble members may be calculated in a single forward pass. As a result, time complexity of the MEAR learning model may be significantly lower than a full ensemble of networks.

Figure 1:
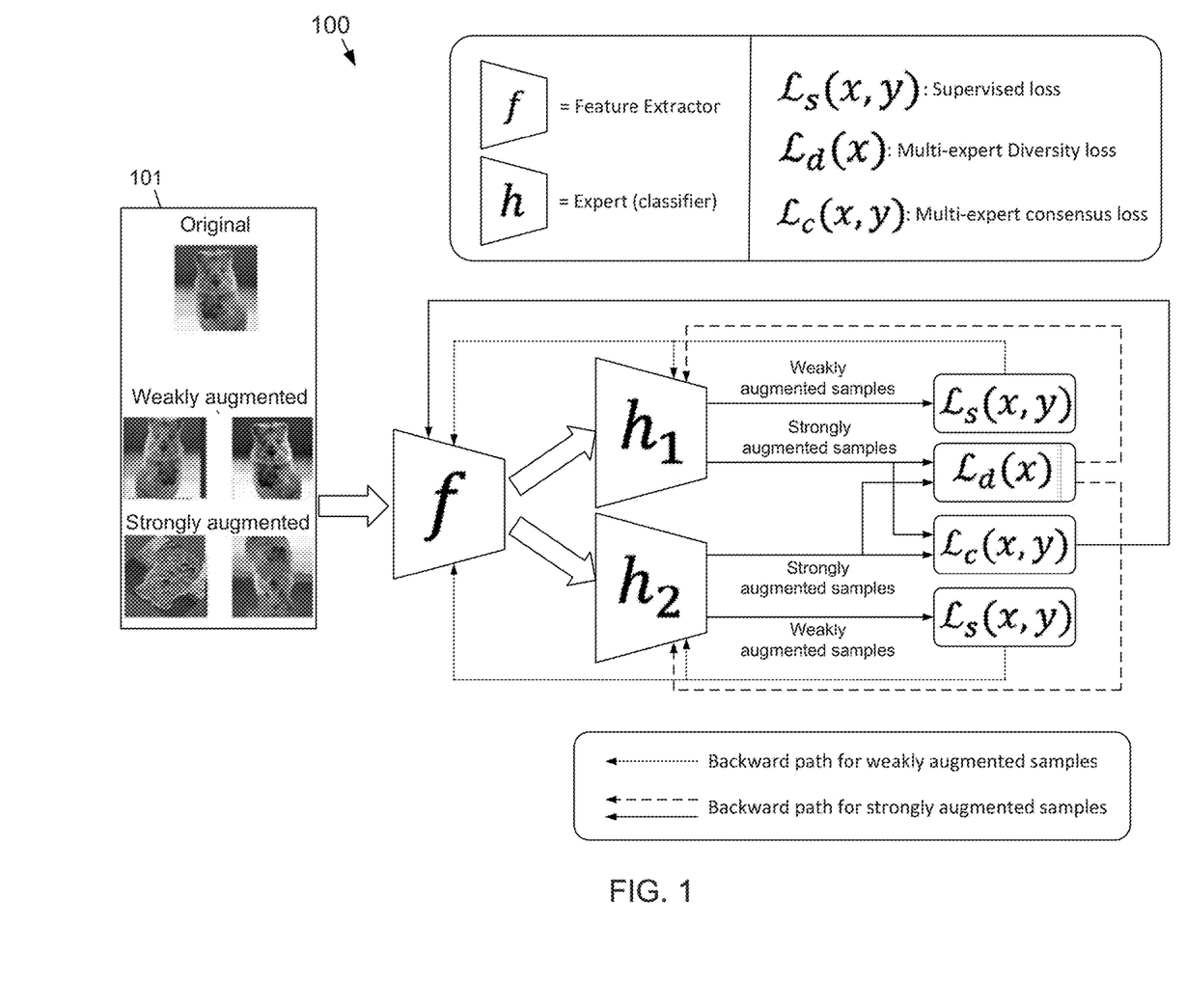
FIG. 1 depicts an overview of an example embodiment of a MEAR learning model architecture according to the subject matter disclosed herein.

FIG. 1 depicts an overview of an example embodiment of a MEAR learning model architecture 100 according to the subject matter disclosed herein. The inputs 101 to the network may be weakly and strongly augmented examples in which x is a data point and y is a label. The MEAR learning model 100 may include a feature extractor f and two experts $h_1$ and $h_2$ (K=2) that may be trained to minimize a supervised loss $\mathcal{L}_s$ (Eq. 2) on weakly augmented samples and to minimize the diversity loss $\mathcal{L}_d$ on strongly augmented samples (Eq. 3). The feature extractor f may be trained to minimize the supervised loss on weakly augmented samples, and to minimize the multi-expert consensus loss $\mathcal{L}_c$ (Eq. 6) on strongly augmented samples. A backward path is provided for each supervised loss $\mathcal{L}_s$ to the corresponding expert and to the feature extractor. A backward path is provided for the diversity loss $\mathcal{L}_d$ to each of the experts, and a backward path is provided for the consensus loss $\mathcal{L}_c$ to the feature extractor.

The MEAR learning model 100 provides a single-input multi-output configuration to a network architecture that enables multiple predictions in a single forward pass. Ensembling the predictions may significantly improve generalization and robustness with minor changes to the number of parameters and computation cost. Additionally, multi-expert diversity and consensus loss functions are introduced. As regularization terms, the multi-expert diversity and consensus-loss functions effectively reduce redundancy among experts, and improve the accuracy of the respective ensembles. The MEAR learning model 100 may be empirically validated in the context of image classification and semantic segmentation on various benchmark datasets. It may also be demonstrated that the MEAR learning model 100 provides superior generalization performance in a low-data regime and is able to learn representations robust to variations across environments, which may be superior to baselines, and as a result is able to make accurate test-time predictions.

Consider the set of training examples $\{(x_n, y_n)\}_{n=1}^{N}$ with a joint distribution $P(x,y)$ in which $x_n$ is the $n^{th}$ data point with the corresponding (one-hot) label $y_n$ and N is a size of the training set. Each of the multiple experts (classifiers) $h_1(\bullet), \ldots, h_K(\bullet)$ with a parameter $\theta_h$, the neural network weights of the classifier, may be constructed with a CNN backbone and a fully connected layer followed by a softmax function to produce class probabilities. To reduce computations and promote information sharing, all experts share the same CNN feature extractor denoted by $f(\bullet)$ with parameter $\theta_f$, the neural network weights of the feature extractor. Once trained, given a test image $x_t$, the prediction $y_t$ of $x_t$ may be obtained by the ensemble of all the experts as $$p(y_t | x_t) = \frac{1}{K} \sum_{k=1}^{K} h_i(f(x_t)). \tag{1}$$

The MEAR learning model 100 may improve the generalization and robustness of the ensemble by using the knowledge of each expert to teach the feature extractor and other experts in an adversarial fashion. Based on recent consistency regularization (CR) methods that highlight an importance of distortion operations, weak augmentation $\alpha(\bullet)$ and strong augmentation $\mathcal{A}(\bullet)$ may be used for input images to train the model. Both $\alpha(\bullet)$ and $\mathcal{A}(\bullet)$ augmentations may be stochastic functions that perform label preserving transformations. More specifically, $\alpha(\bullet)$ may correspond to simple transformations (e.g., scale, shift, color jitter), while, $\mathcal{A}(\bullet)$ may induce stronger noises to make the input more diverged from the original distribution. A RandAugment may be used to implement $\mathcal{A}(\bullet)$ in which RandAugment randomly selects a set of transformations, e.g., shearing, rotation, auto-contrast, sharpness, etc. A loss function for the MEAR learning model includes three terms that are explained below.

Supervised Loss

The experts and the feature extractor may be trained together to correctly classify weakly augmented samples. To this end, a supervised loss $\mathcal{L}_s$ may be applied to $f(\bullet)$ and $\{h_i(\bullet)\}_{i=1}^{K}$ on weakly augmented data to correctly classify labeled examples. In order to make the experts and feature extractor obtain task-specific discriminative features, this operation may be important. By denoting $H(\bullet,\bullet)$ as a cross-entropy between two probability distributions, the supervised loss function $\mathcal{L}_s$ may be represented as:

$$\mathcal{L}_s := \frac{1}{K} \sum_{k=1}^{K} \mathbb{E}_{x,y \sim P(x,y)}[H(y, h_i(f(\alpha(x))))] \tag{2}$$

in which $\mathbb{E}$ denotes an expectation operator.

Multi-Expert Diversity Loss

As downstream tasks may benefit from combining expert representations aimed at capturing different aspects of the learning task, the experts may be trained to maximize diversity among the experts for the strongly augmented samples. Omitting this operation may cause the experts to quickly homogenize, leading all experts to converge and be similar to each other. Another attractive property of expert diversity may be robustness against corruption: an adversarial perturbation may mislead one expert to misclassify, but may not fool other experts consistently. To this end, a diversity loss $\mathcal{L}_d$ may be applied to $\{h_i(\bullet)\}_{i=1}^{K}$ on strongly augmented samples that may be defined as:

$$\mathcal{L}_d := -\mathbb{E}_{x \sim P(x)} \mathbb{D}(h_1(f(\mathcal{A}(x))), \ldots, h_K(f(\mathcal{A}(x)))) \tag{3}$$

As used herein, the statistical distance $\mathbb{D}$ may be defined as the $l_1$ distance between the outputs of the experts and the output of their ensemble:

$$\mathbb{D}(p_1, \ldots, p_K) := \sum_{i=1}^{K} \|p_i - \bar{p}\|_1 \tag{4}$$

in which $\|\bullet\|$ denotes the $l_1$ norm and $$p_i = h_i(f(\mathcal{A}(x))), \quad \bar{p} = \frac{1}{K} \sum_{k=1}^{K} p_i. \tag{5}$$

A diversity loss may prevent redundancy between experts by explicitly forcing the experts to be inconsistent on strongly augmented samples. The loss function may serve as a regularization term to prevent group performance degradation caused by homogenization.

Multi-Expert Consensus Loss

In order to ensure the ensemble prediction for strongly augmented samples is consistent with the target labels, a multiexpert consensus loss may be used in which $f(\bullet)$ may be encouraged to generate features so that the ensemble predictions for strongly augmented examples may be close to the target annotations/labels. Such a design may explicitly teach the feature extractor how to handle data from unseen domains (mimicked by strong augmentation), thereby improving robustness to new domains. The loss may be represented as:

$$\mathcal{L}_c := \mathbb{E}_{x,y \sim P(x,y)}[H(y, \bar{h}(f(\mathcal{A}(x))))] \tag{6}$$

Training

Training involves training K experts and the feature extractor. The K experts may take inputs from the feature extractor and maximize $\mathbb{D}(h_1(\bullet), \ldots, h_K(\bullet))$ over strongly augmented samples, and the feature extractor tries to generate discriminative and robust features. This involves two operations.

First, the experts (for a fixed-feature extractor $f(\bullet)$) may be trained by minimizing the supervised loss $\mathcal{L}_s$ to correctly classify the weakly augmented samples and the diversity loss $\mathcal{L}_d$ to encourage diversity over strongly augmented samples. The objective may be defined as $$\theta_c^* = \underset{\theta_c}{\mathrm{argmin}}\, \mathcal{L}_s + \lambda \mathcal{L}_d, \tag{7}$$

in which $\lambda$ is a hyper-parameter to control a trade-off between the expert diversity on strongly augmented samples and prediction accuracy on weakly augmented examples.

Next, the feature extractor (for fixed experts) may be trained to minimize the supervised loss and multi-expert consensus loss to respectively generate task-discriminative and robust features. The objective may be defined as $$\theta_f^* = \underset{\theta_f}{\mathrm{argmin}}\, \mathcal{L}_s + \gamma \mathcal{L}_d, \tag{8}$$

in which $\gamma$ is a hyper-parameter to control a trade-off between the supervised loss on weakly augmented samples and consensus loss on strongly augmented samples.

Extension to Semantic Segmentation

Figure 2:
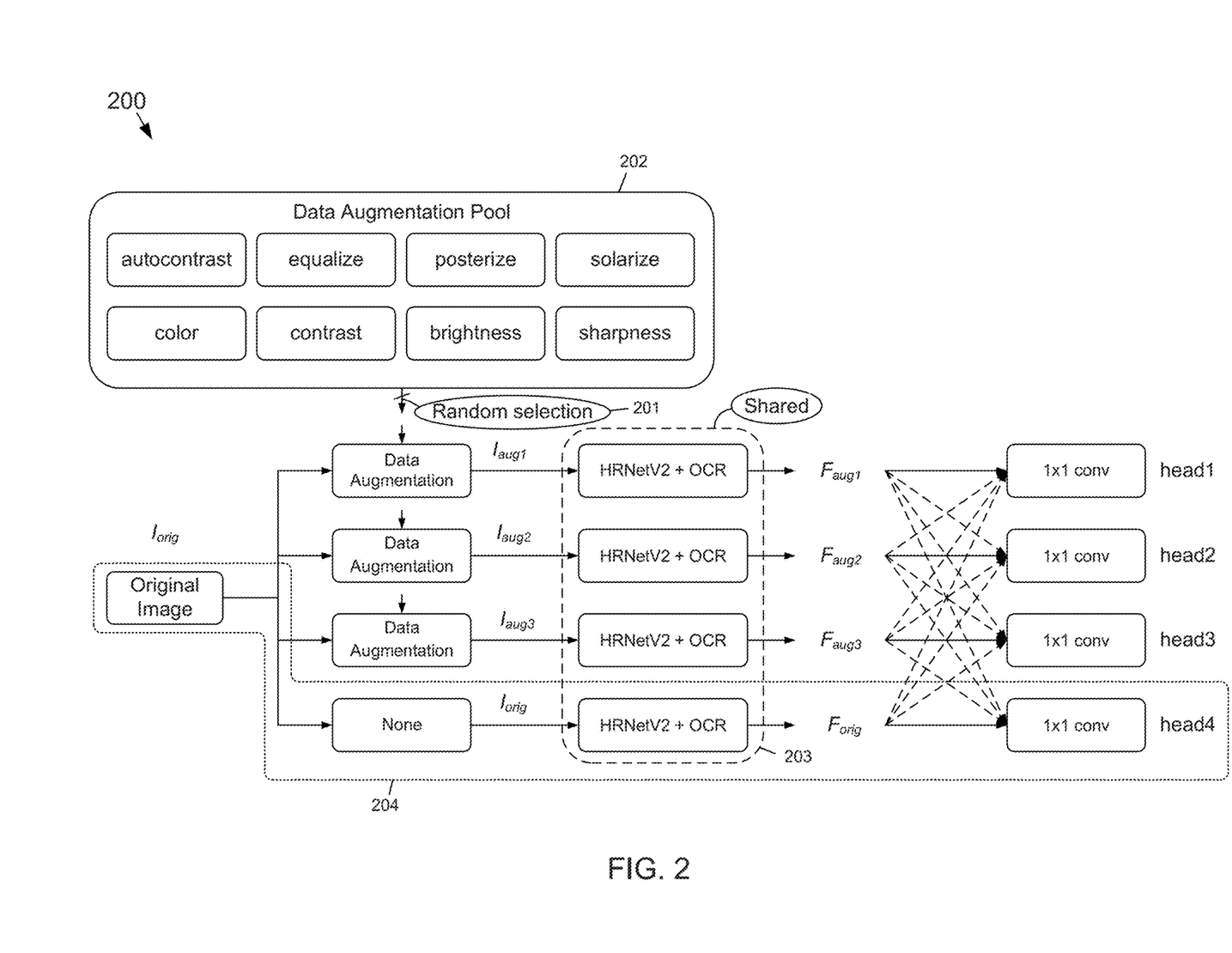
FIG. 2 depicts another example embodiment of a MEAR learning model framework for semantic segmentation according to the subject matter disclosed herein.
Figure 3:
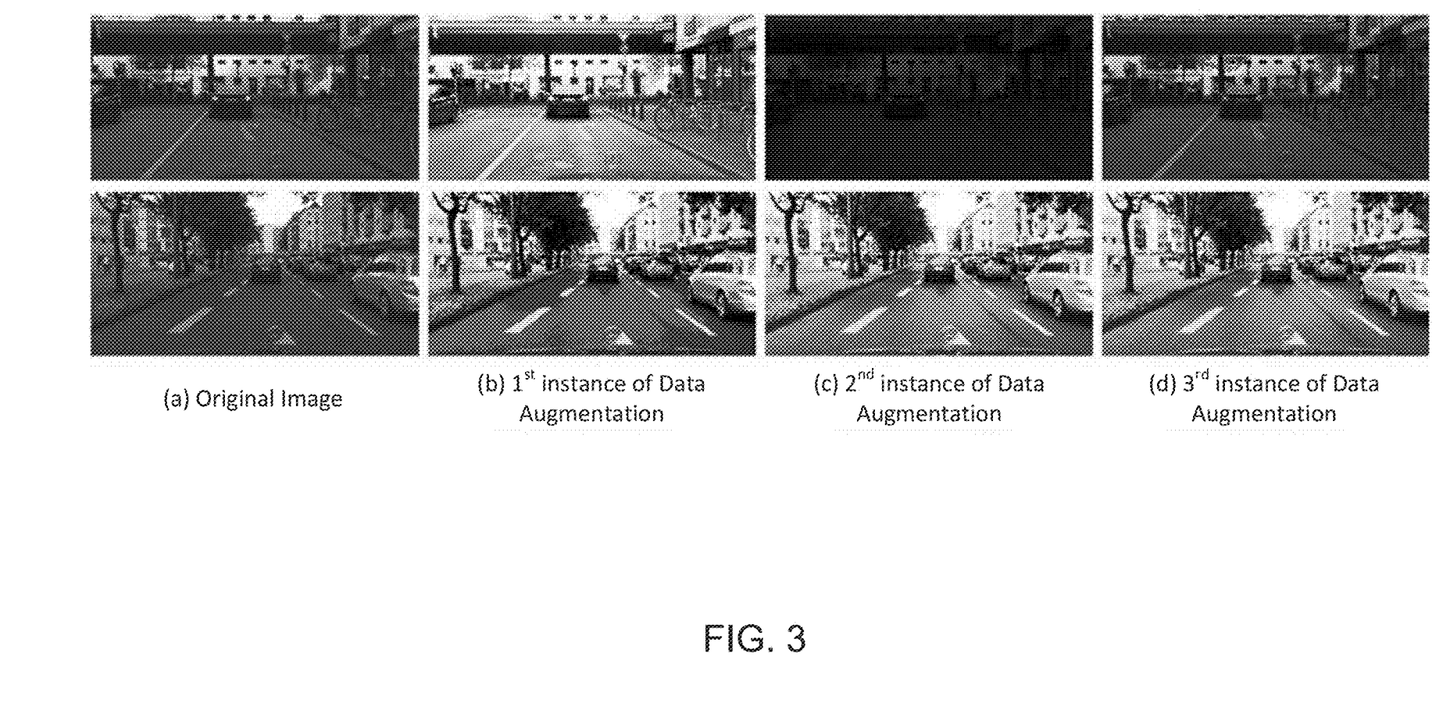
FIG. 3 shows two rows of example images generated by seg-AugMix that may be input to different branches (experts) of the MEAR learning model according to the subject matter disclosed herein.

FIG. 2 depicts another example embodiment of a MEAR learning model framework 200 for semantic segmentation according to the subject matter disclosed herein. Each data augmentation may be randomly selected 201 from a data augmentation pool 202 for each expert. In one embodiment, the MEAR learning model 200 may include a seg-AugMix that may be defined as a special case in which all the data augmentations that change the segmentation map labels may be removed from a data augmentation pool 201. A seg-AugMix may be used to generate a data augmentation pool that may also be used as a data-augmentation pool for the MEAR learning model for semantic segmentation networks. Specifically, the data augmentation pool may include "autocontrast," "equalize," "posterize," "solarize," "color," "contrast," "brightness," and "sharpness." Two rows of example images generated by seg-AugMix are shown in FIG. 3 for different branches (experts) of the model. Two original images are shown at in the column (a). Three example instances of data augmentations are shown in the columns at (b)-(d) that may be generated by applying a series of image modifications of the original image. It should be understood that any number of data augmentations may be generated for an original image. Additionally, it should be understood that each image (or sample) or a subset of all of the images (or samples) in a training set may be augmented.

The augmented images together with the original image may be input into a feature extraction network 203, such as HRNetV2+Object-Context Representation (OCR), to obtain the augmented feature. Next, the MEAR learning model for semantic segmentation drops a mix operation that may be used in, for example, AugMix to ensemble multiple augmented images into a single augmented image. That is, the augmented samples are not combined. In contrast, a mixing operation is performed in the original AugMix algorithm in which multiple augmented samples are combined to generate a final augmented sampled to input to the neural network. Instead, both strong and weak augmentations may be similarly sampled from the same augmentation pool and input into the feature extraction network to obtain the corresponding augmented features.

Each of the expert heads then may sample a different augmented feature to provide a segmentation map with soft-output reliability at each pixel of the corresponding augmented image. That is, each augmented feature may be sent to a corresponding expert head (i.e., via solid path lines). During training time, the augmented feature may also be sent to different expert heads (i.e., via dashed path lines) for calculating diversity loss and ensemble consistency loss. During inference time, only the operation 204 outlined by a dotted line on the bottom line in FIG. 2 may be executed. Each expert may have its own head, which is a 1×1 convolution in the example embodiment architecture 200. An ensemble operation merges the reliability maps from each expert head to generate a prediction.

Figure 4:
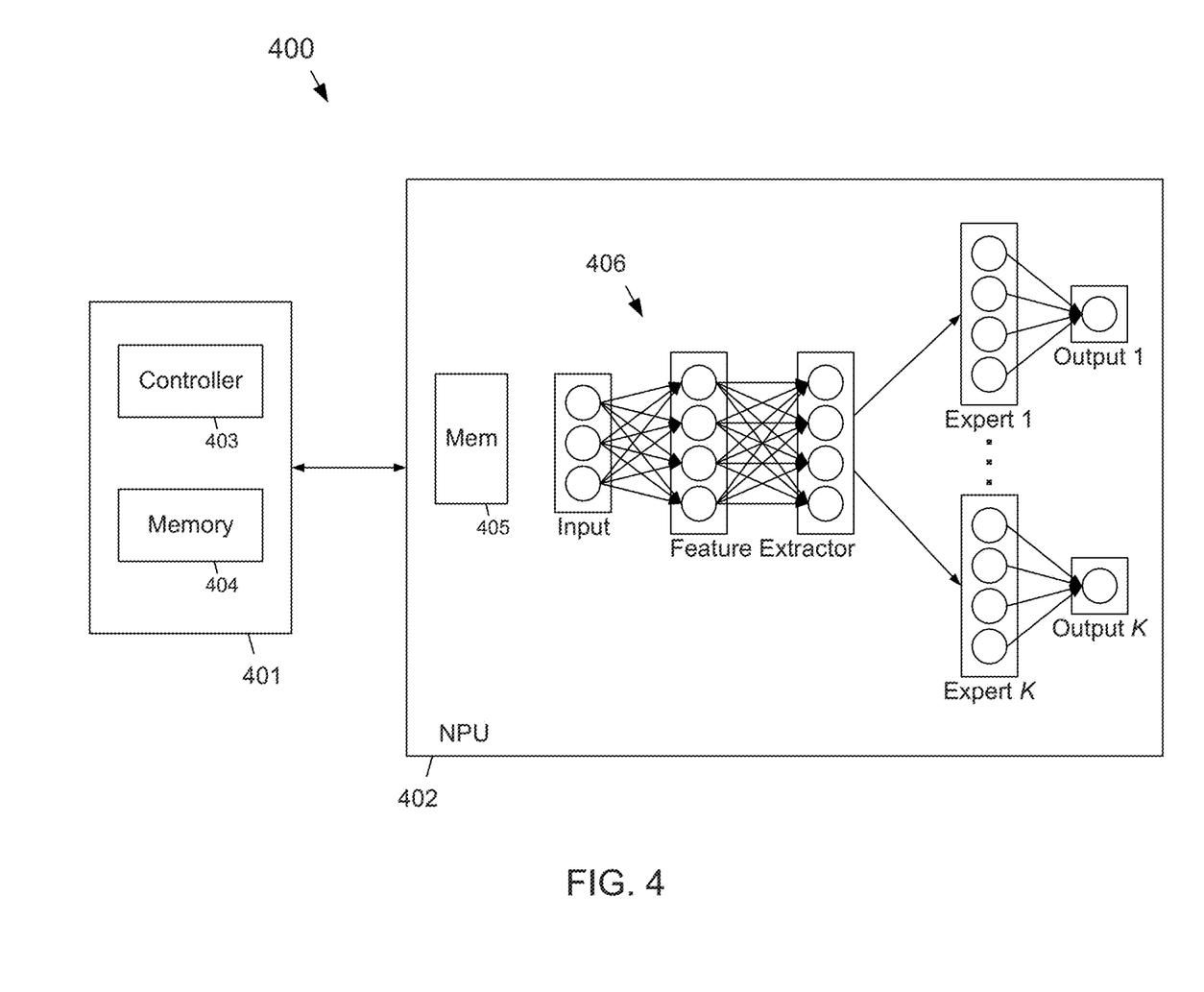
FIG. 4 depicts a system to train a neural network using the MEAR learning architecture according to the subject matter disclosed herein.

FIG. 4 depicts a system 400 to train a neural network using the MEAR learning architecture according to the subject matter disclosed herein. The system 400 may include a host processing device 401 and a neural processing unit 402. The host processing device 401 may include a processor 403 and a memory 404. In one embodiment, the memory 404 may include DRAM. The neural processing unit 402 may include a memory 405, and multipliers, adder trees and accumulators that are not shown. The various components forming the host processing device 401 and the neural processing unit 402 may be modules that may be embodied as a software package, code and/or instruction set or instructions, as an assembly, hardwired circuitry, programmable circuitry, state machine circuitry, and/or firmware that stores instructions executed by programmable circuitry.

The host processing device 401 may configure the neural processing unit 402 to form a neural network 406 having multiple experts (classifiers) $h_1(\cdot), \ldots, h_K(\cdot)$ with a parameter $\theta_h$ may be constructed with a CNN backbone and a fully connected layer followed by a softmax function (not specifically shown) to produce class probabilities.

The number of experts K used in a MEAR learning architecture may vary depending upon the application. Too few experts may, for example, not fully leverage the benefits of ensemble-diversity learning. When K=1 may be equivalent to a traditionally trained network because there is only one expert. As K increases, the performance of the ensemble head improves. Moreover, inference accuracy obtained from the ensemble may peak using five expert heads.

Figure 5:
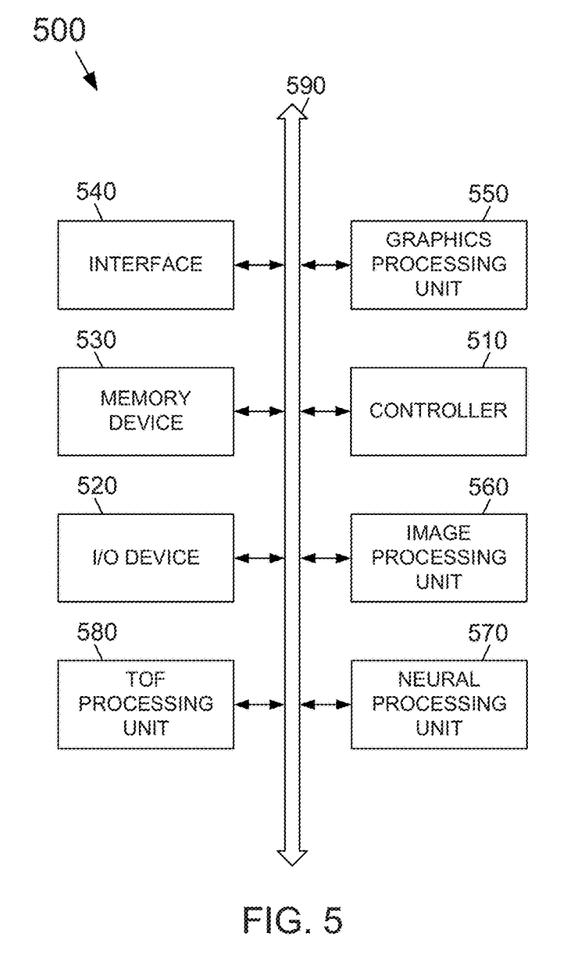
FIG. 5 depicts an electronic device that may be configured to train a neural network using the MEAR learning architecture according to the subject matter disclosed herein.

FIG. 5 depicts an electronic device 500 that may be configured to train a neural network using the MEAR learning architecture according to the subject matter disclosed herein. The electronic device 500 may include a controller (or CPU) 510, an input/output device 520 such as, but not limited to, a keypad, a keyboard, a display, a touch-screen display, a 2D image sensor, a 3D image sensor, a memory 530, an interface 540, a GPU 550, an imaging-processing unit 560, a neural processing unit 570, a TOF processing unit 580 that are coupled to each other through a bus 590. The controller 510 may include, for example, at least one microprocessor, at least one digital signal processor, at least one microcontroller, or the like. The memory 530 may be configured to store a command code to be used by the controller 510 and/or to store a user data. In one embodiment, the controller 510 may configure and control the neural processing unit 570 or a neural processing unit (not shown) that is external to the electronic device 500 to train a neural network using the MEAR learning architecture according to the subject matter disclosed herein.

Electronic device 500 and the various system components of electronic device 500 may be formed from one or modules. The interface 540 may be configured to include a wireless interface that is configured to transmit data to or receive data from, for example, a wireless communication network using a RF signal. The wireless interface 540 may include, for example, an antenna. The electronic system 500 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to train a neural network, the method comprising:
weakly augmenting a first image, by a controller, $k_1$ times to form $k_1$ weakly augmented first images;
strongly augmenting the first image, by the controller, $k_2$ times to form $k_2$ strongly augmented first images, $k_1+k_2=K$ in which $k_1$, $k_2$ and $K$ are integers;
obtaining, by the controller, augmented features from the first image, the $k_1$ weakly augmented first images and the $k_2$ strongly augmented first images;
determining, by the controller, a supervised loss $\mathcal{L}_s$ for each weakly augmented first image;
determining, by the controller, a diversity loss $\mathcal{L}_d$ for each strongly augmented first image;
training a feature extraction network, by the controller, to minimize the supervised loss $\mathcal{L}_s$ on the $k_1$ weakly augmented first images and to minimize a multi-expert consensus loss $\mathcal{L}_c$ on the $k_2$ strongly augmented first images;
training each first expert head of $k_1$ first expert heads, by the controller, to minimize the supervised loss $\mathcal{L}_s$ for each weakly augmented first image; and
training each second expert head of $k_2$ second expert heads, by the controller, to minimize the diversity loss $\mathcal{L}_d$ for each strongly augmented first image.

2. The method of claim 1, wherein weakly augmenting the first image comprises weakly augmenting the first image, by the controller, using an augmenting technique selected from a group of augmenting techniques.

3. The method of claim 2, wherein the group of augmenting techniques includes an autocontrast augmenting technique, an equalizing augmenting technique, a posterizing augmenting technique, a solarizing augmenting technique, a color augmenting technique, a contrast augmenting technique, a brightness augmenting technique, and a sharpness augmenting technique.

4. The method of claim 3, wherein weakly augmenting the first image further comprises weakly augmenting the first image, by the controller, using the augmenting technique that has been randomly selected from the group of augmenting techniques.

5. The method of claim 1, wherein strongly augmenting the first image comprises strongly augmenting the first image, by the controller, using an augmenting technique selected from a group of augmenting techniques.

6. The method of claim 5, wherein the group of augmenting techniques includes an autocontrast augmenting technique, an equalizing augmenting technique, a posterizing augmenting technique, a solarizing augmenting technique, a color augmenting technique, a contrast augmenting technique, a brightness augmenting technique, and a sharpness augmenting technique.

7. The method of claim 6, wherein strongly augmenting the first image comprises strongly augmenting the first image, by the controller, using the augmenting technique randomly that has been selected from the group of augmenting techniques.

8. The method of claim 1, further comprising running, by the controller, an inference operation of the neural network trained by the method of claim 1.

9. A method to train a neural network, the method comprising:
   selecting a first augmenting technique from a group of augmenting techniques;
   weakly augmenting a first image, by a controller, $k_1$ times using the first augmenting technique to form $k_1$ weakly augmented first images;
   selecting a second augmenting technique from the group of augmenting techniques;
   strongly augmenting the first image, by the controller, $k_2$ times using the second augmenting technique to form $k_2$ strongly augmented first images, $k_1+k_2=K$ in which $k_1$, $k_2$ and $K$ are integers;
   obtaining, by the controller, augmented features from the first image, the $k_1$ weakly augmented first images and the $k_2$ strongly augmented first images;
   determining, by a corresponding first expert head, a supervised loss $\mathcal{L}_s$ for each weakly augmented first image;
   determining, by a corresponding second expert head, a diversity loss $\mathcal{L}_d$ for each strongly augmented first image;
   training a feature extraction network, by the controller, to minimize the supervised loss $\mathcal{L}_s$ on the $k_1$ weakly augmented first images and to minimize a multi-expert consensus loss $\mathcal{L}_c$ on the $k_2$ strongly augmented first images;
   training each first expert head, by the controller, to minimize the supervised loss $\mathcal{L}_s$ for each weakly augmented first image; and
   training each second expert head, by the controller, to minimize the diversity loss $\mathcal{L}_d$ for each strongly augmented first image.

10. The method of claim 9, wherein the group of augmenting techniques includes an autocontrast augmenting technique, an equalizing augmenting technique, a posterizing augmenting technique, a solarizing augmenting technique, a color augmenting technique, a contrast augmenting technique, a brightness augmenting technique, and a sharpness augmenting technique.

11. The method of claim 9, wherein the first augmenting technique is different from the second augmenting technique.

12. The method of claim 9, wherein selecting the first augmenting technique comprises randomly selecting the first augmenting technique from the group of augmenting techniques.

13. The method of claim 9, wherein selecting the second augmenting technique comprises randomly selecting the second augmenting technique from the group of augmenting techniques.

14. The method of claim 9, wherein the first image comprises part of a group of images.

15. The method of claim 14, wherein the method is performed on a subset of the group of images.

16. The method of claim 14, wherein the method is performed on each image in the group of images.

17. The method of claim 9, further comprising running, by the controller, an inference operation of the neural network trained by the method of claim 9.

18. A system to train a neural network, the system comprising:
   a neural processing circuit comprising a first memory; and
   a host computing device comprising a second memory, the host computing device configured to:
      weakly augment a first image $k_1$ times to form $k_1$ weakly augmented first images;
      strongly augment the first image $k_2$ times to form $k_2$ strongly augmented first images, $k_1+k_2=K$ in which $k_1$, $k_2$ and $K$ are integers; and
   control the neural processing circuit to:
      obtain augmented features from the first image, the $k_1$ weakly augmented first images and the $k_2$ strongly augmented first images;
      determine a supervised loss $\mathcal{L}_s$ for each weakly augmented first image;
      determine a diversity loss $\mathcal{L}_d$ for each strongly augmented first image;
      train a feature extraction network to minimize the supervised loss $\mathcal{L}_s$ on the $k_1$ weakly augmented first images and to minimize a multi-expert consensus loss $\mathcal{L}_c$ on the $k_2$ strongly augmented first images;
      train each first expert head to minimize the supervised loss $\mathcal{L}_s$ for each weakly augmented first image; and
      train each second expert head to minimize the diversity loss $\mathcal{L}_d$ for each strongly augmented first image.

19. The system of claim 18, wherein the host computing device is further configured to weakly augment the first image using a first augmenting technique selected from a group of augmenting techniques, and to strongly augment the first image using a second augmenting technique selected from the group of augmenting techniques.

20. The system of claim 19, wherein the group of augmenting techniques includes an autocontrast augmenting technique, an equalizing augmenting technique, a posterizing augmenting technique, a solarizing augmenting technique, a color augmenting technique, a contrast augmenting technique, a brightness augmenting technique, and a sharpness augmenting technique.

* * * * *